United States Patent Office

3,282,674
Patented Nov. 1, 1966

3,282,674
PRODUCTION OF GRANULATED AMMONIUM SULFATE NITRATE
Siegfried Mohr, Ludwigshafen (Rhine), Dietrich Luetzow, Limburgerhof, Pfalz, and Hans Schulz, Ludwigshafen (Rhine), Germany, assignors to Badische Anilin- & Soda-Fabrik Aktiengesellschaft, Ludwigshafen (Rhine), Germany
No Drawing. Filed Aug. 20, 1963, Ser. No. 303,432
Claims priority, application Germany, Sept. 4, 1962, B 68,703
6 Claims. (Cl. 71—64)

This invention relates to a process for the production of prilled ammonium sulfate nitrate.

Granulated ammonium sulfate nitrate, a mixture or compound of ammonium sulfate and ammonium nitrate, which has been used as a fertilizer in large amounts for decades, is prepared by granulating the components ammonium sulfate and ammonium nitrate, the ammonium nitrate used in the form of its concentrated solution serving at the same time as a granulation auxiliary. The granulated fertilizer may however also be prepared by granulating in a conventional way the double salt obtained by the saturation method and having the formula $2NH_4NO_3 \cdot (NH_4)_2SO_4$ or $3NH_4NO_3 \cdot (NH_4)_2SO_4$ in admixture with an excess of ammonium sulfate.

It is also known to add to ammonium sulfate nitrate to increase its stability in storage small amounts of salts capable of binding water of crystallization, for example magnesium salts or sodium salts or double salts of magnesium, such as $K_2SO_4 \cdot MgSO_4$. It has also been proposed to add salts of aluminum or iron to ammonium sulfate nitrate for the same purpose.

In the production of granulated ammonium sulfate nitrate attempts have already been made to convert mashes into spherical granules by prilling. Mashes which are capable of being prilled must be heated to temperatures which cause decomposition. High temperatures have the additional disadvantage, that it is not possible to solidify the prilled droplets satisfactorily. To obviate these difficulties it is known to add sodium nitrate or sodium sulfate to the mash to be prilled. Although the difficulties occurring in the prilling process itself are obviated in this way, the product obtained, which initially consists of hard and spherical particles, quickly becomes soft under the action of humidity and has a strong tendency to agglomerate upon prolonged storage. The initially high grain hardness also declines strongly after long storage under the action of humidity when the above-mentioned additions of salts of magnesium, iron and aluminum are made.

It is an object of the present invention to provide a process by which the said disadvantages in the prilling of ammonium sulfate nitrate mashes are avoided and which gives a product which retains its grain hardness even in prolonged storage.

This object is achieved by using a mash which contains an amphoteric oxidic compound in an amount of 0.3 to 3.5% by weight, a weakly alkaline reacting compound in an amount of 0.1 to 2.0% by weight and a salt which binds water in an amount of 0.5 to 5% by weight, said percentages being based on anhydrous ammonium sulfate nitrate.

Oxides, hydroxides and hydrated oxides, particularly of trivalent iron and aluminum, may be used as amphoteric oxidic compounds. It is not essential to add the oxidic compounds as such to the mash, but it is sufficient to add the salts of the said metals to the mash so that under the influence of the weakly alkaline reacting compounds added at the same time, the said oxidic compounds are formed. Suitable alkaline reacting substances are ammonia or solid substances whose 10% solutions have a pH value not above 10.5. Such substances are for example calcium carbonate, magnesium carbonate, dolomite, magnesium oxide, sodium bicarbonate, potassium bicarbonate, monohydrogen dipotassium phosphate, monohydrogen disodium phosphate, monohydrogen diammonium phosphate, triammonium phosphate and sodium tetraborate. These substances are added to the mash prior to prilling or, if ammonia is used as weakly alkaline reacting compound, the mash is gassed for a short time with ammonia. Salts having water-binding properties are for example magnesium sulfate, magnesium nitrate, calcium sulfate and calcium sulfate semihydrate, calcium nitrate and sodium sulfate may be added if necessary. The amphoteric oxidic compound should be added to the mash prior to prilling in an amount of 0.3 to 3.5% by weight, preferably 1.0 to 3.0% by weight, based on anhydrous ammonium sulfate nitrate. The weakly alkaline reacting compound should be added in an amount of 0.1 to 2.0% by weight, preferably 0.1 to 0.7% by weight, and the salt which binds water in an amount of 0.5 to 5% by weight, preferably 1.0 to 3.5% by weight, all percentages based on anhydrous ammonium sulfate nitrate.

The mash is advantageously prilled at temperatures of 160° to 182° C.

The invention is illustrated by the following examples. The tons referred to are metric tons.

*Example 1*

2.5 tons of ferric hydroxide ($Fe_2O_3 \cdot 3H_2O$), 3.8 tons of magnesium nitrate, and 0.68 ton of ammonia (1.2, 1.8 and 0.3% by weight, respectively, with reference to anhydrous ammonium sulfate nitrate) and 120 tons of ammonium sulfate are stirred at about 170° C. into 86 tons of an ammonium nitrate melt having a water content of about 3% by weight. The mash thus pretreated may be prilled in a conventional way. The globular product obtained has a pale yellow brown color. The grain hardness, which is initially 4.1 kg., is still 3.8 kg. after storage for six months under the usual conditions of storage in the fertilizer trade. Grain hardness is defined as the load in kg. at which the grain is destroyed.

*Example 2*

5.8 tons of hydrous ferrous sulfate, 2.9 tons of anhydrous magnesium sulfate and 1.44 tons of calcium carbonate or finely ground limestone powder (2.6, 1.2 and 0.6% by weight, respectively, with reference to anhydrous ammonium sulfate nitrate) together with 120 tons of ammonium sulfate are stirred at temperatures of 160° to 170° C. into 100 tons of an ammonium nitrate melt having a water content of about 3% by weight. The mobile mash is prilled by a conventional method, for example by means of a centrifuge. The globular granulate obtained has a very smooth surface and is furthermore distinguished by a very compact structure. The grain hardness, initially 3.9 kg., practically does not decline even after several months storage. Moreover it does not agglomerate. Disengagement of ammonia cannot be detected either in the production or in storage.

*Example 3*

2.3% by weight of aluminum sulfate ($Al_2(SO_4)_3 \cdot H_2O$) having an $Al_2O_3$ content of 17 to 18% by weight, 1.7% by weight of anhydrous magnesium sulfate and 0.8% by weight of $CaCO_3$ are added to a mash at 175 to 182° C. consisting of 66 tons of 98% ammonium nitrate and 89 tons of ammonium sulfate. The produce is prilled by means of centrifuges. The resultant almost spherical granulate has an initial grain hardness of 3.8 kg. which does not appreciably change even on prolonged storage.

If 1.7% by weight, based on anhydrous ammonium sulfate nitrate, of magnesium nitrate is added to the mash instead of magnesium sulfate, a granulate with a grain hardness of 3.7 kg. is obtained.

*Example 4*

A mixture of 150 tons of ammonium sulfate, 7.2 tons of magnesium sulfate, 1.3 tons of dolomite and 2.1 tons of ferric oxide is added to 100 tons of 96% ammonium nitrate melt at 180° C. while stirring. The mash is prilled in a centrifuge and a spherical granulate having a grain hardness of 3.6 kg. is obtained. The grain hardness does not appreciably change on prolonged storage.

We claim:

1. A process for the production of granular ammonium sulfate nitrate which compises prilling a mash of ammonium sulfate and ammonium nitrate at temperatures of 160° to 182° C., said mash containing an amphoteric oxidic compound selected from the group consisting of oxides, hydroxides and hydrated oxides of trivalent iron and aluminum in an amount of 0.3 to 3.5% by weight, a weakly alkaline reacting compound selected from the group consisting of ammonia, calcium carbonate, magnesium carbonate, dolomite, magnesium oxide, sodium bicarbonate, potassium bicarbonate, monohydrogen dipotassium phosphate, monohydrogen disodium phosphate, monohydrogen diammonium phosphate, triammonium phosphate and sodium tetraborate of 0.1 to 2.0% by weight, and a water-binding salt selected from the group consisting of magnesium sulfate, magnesium nitrate, calcium sulfate, calcium sulfate semihydrate, calcium nitrate and sodium sulfate in an amount of 0.5 to 5% by weight, said percentages being based on anhydrous ammonium sulfate nitrate, to obtain solidified, essentially granular particles having high grain hardness which is retained after several months storage.

2. A process as claimed in claim 1 wherein said amphoteric oxidic compound is ferric hydroxide, said weakly alkaline substance is calcium carbonate, and said water-binding salt is magnesium sulfate.

3. A process as claimed in claim 1 wherein said amphoteric oxidic compound is $Fe_2O_3$, said weakly alkaline substance is calcium carbonate and said water-binding salt is magnesium sulfate.

4. A process as claimed in claim 1 wherein said amphoteric oxidic compound is $Al_2O_3$, said weakly alkaline substance is calcium carbonate, and said water-binding salt is magnesium sulfate.

5. A process for the production of granular ammonium sulfate nitrate which comprises prilling a mash of ammonium sulfate and ammonium nitrate at temperatures of 160 to 182° C., said mash containing an amphoteric oxidic compound selected from the group consisting of oxides, hydroxides and hydrated oxides of trivalent iron and aluminum in an amount of 1.0 to 3.0% by weight, a weakly alkaline reacting compound, said compound being a member selected from the group consisting of ammonia, calcium carbonate, magnesium carbonate, dolomite, magnesium oxide, sodium bicarbonate, potassium bicarbonate, monohydrogen dipotassium phosphate, monohydrogen disodium phosphate, monohydrogen diammonium phosphate, triammonium phosphate and sodium tetraborate in an amount of 0.1 to 0.7% by weight, and a water-binding salt, said salt being a member selected from the group consisting of magnesium sulfate, magnesium nitrate, calcium sulfate, calcium sulfate semihydrate, calcium nitrate and sodium sulfate in an amount 1.0 to 3.5% by weight, said percentages being based on anhydrous ammonium sulfate nitrate, to obtain solidified, essentially granular particles having high grain hardness which is retained after several months storage.

6. A process for the production of granular ammonium sulfate nitrate which comprises forming a mash of ammonium sulfate and ammonium nitrate at a temperature of 160–182° C., incorporating into said mash an inorganic salt selected from the group consisting of an iron inorganic salt and an aluminum inorganic salt, a weakly alkaline reacting compound selected from the group consisting of ammonia, calcium carbonate, magnesium carbonate, dolomite, magnesium oxide, sodium bicarbonate, potassium bicarbonate, monohydrogen dipotassium phosphate, monohydrogen disodium phosphate, monohydrogen diammonium phosphate, triammonium phosphate and sodium tetraborate of 0.1 to 2.0% by weight, and a water-binding salt selected from the group consisting of magnesium sulfate, magnesium nitrate, calcium sulfate, calcium sulfate semihydrate, calcium nitrate and sodium sulfate in an amount of 0.5 to 5% by weight, the weight of said first-mentioned inorganic salt being sufficient to provide, upon reaction in said mash, of said first-mentioned inorganic salt and said weakly alkaline reacting compound a resultant amphoteric oxidic compound selected from the group consisting of oxides, hydroxides, and hydrated oxides of iron and aluminum in an amount of 3.0 to 3.5% by weight, the aforesaid percentages being based on anhydrous ammonium sulfate nitrate of said mash, and prilling the resultant mash to obtain solidified, essentially granular particles having high grain hardness which is retained after several months storage.

References Cited by the Examiner

UNITED STATES PATENTS

| | | | |
|---|---|---|---|
| 2,795,495 | 6/1957 | Schmatlock et al. | 71—64 |
| 2,893,858 | 7/1959 | MacConald et al. | 71—64 |
| 2,903,349 | 9/1959 | Bryant | 71—64 |
| 2,957,763 | 10/1960 | Barnes et al. | 71—64 |
| 2,991,170 | 7/1961 | Szepesi et al | 71—64 |
| 3,021,207 | 2/1962 | Stengel | 71—64 |
| 3,050,385 | 8/1962 | Parker | 71—64 |

DONALL H. SYLVESTER, *Primary Examiner.*

ANTHONY SCIAMANNA, *Examiner.*

T. D. KILEY, *Assistant Examiner.*